US005710989A

United States Patent [19]

Flood

[11] Patent Number: 5,710,989

[45] Date of Patent: Jan. 20, 1998

[54] WATER-ACTIVATED EMERGENCY RADIO BEACON

[75] Inventor: John F. Flood, Plantation, Fla.

[73] Assignee: ACR Electronics, Inc., Ft. Lauderdale, Fla.

[21] Appl. No.: 714,829

[22] Filed: Sep. 17, 1996

Related U.S. Application Data

[63] Continuation of Ser. No. 453,446, May 30, 1995, which is a continuation of Ser. No. 116,465, Sep. 3, 1993.

[51] Int. Cl.$^6$ .......... H04B 1/034

[52] U.S. Cl. .......... 455/100; 455/128; 200/61.05; 441/89; 340/573; 340/539

[58] Field of Search .......... 455/89, 90, 95, 455/96, 97, 98, 99, 100, 128, 66; 340/620, 573, 604, 605, 309.4, 539; 200/61.04, 61.05, 182, 190, 199; 441/7.95, 80, 88, 89; 114/183 R

[56] References Cited

U.S. PATENT DOCUMENTS

| | | | |
|---|---|---|---|
| 3,688,293 | 8/1972 | Sullivan | 340/309.4 X |
| 4,408,193 | 10/1983 | Millen et al. . | |
| 4,638,291 | 1/1987 | Puscasu | 340/620 X |
| 4,688,027 | 8/1987 | Widener | 200/61.05 |
| 4,714,914 | 12/1987 | Boe | 200/61.04 |
| 4,843,305 | 6/1989 | Akiloa | 340/605 |
| 5,008,650 | 4/1991 | Hoiberg | 200/61.05 |
| 5,043,704 | 8/1991 | Blakeney | 200/61.05 |
| 5,059,952 | 10/1991 | Wen | 340/573 |
| 5,130,708 | 7/1992 | Boyden | 114/183 R |
| 5,193,215 | 3/1993 | Olmer | 455/66 |
| 5,274,359 | 12/1993 | Adams | 455/100 X |
| 5,311,100 | 5/1994 | Brain . | |
| 5,326,297 | 7/1994 | Loughlin | 441/89 |

*Primary Examiner*—Reinhard J. Eisenzopf
*Assistant Examiner*—Philip J. Sobutka
*Attorney, Agent, or Firm*—Malin, Haley, DiMaggio & Crosby

[57] ABSTRACT

An emergency position indicating radio beacon, sized for mounting on a life vest or the like, that includes a water-activated switch that automatically activates the transmitter when the water-activated switch is mounted in water. The water-activated switching circuitry includes an insulated electrical paddle that separates the exposed electrical contacts a predetermined distance to insure that the device will not be inadvertently activated by moisture, but that it must be immersed in water for proper contact. The system also includes a memory circuit and power amplification.

4 Claims, 2 Drawing Sheets

WATER-ACTIVATED EMERGENCY RADIO BEACON

This application is a continuation of application Ser. No. 08/453,446, filed May 30, 1995, which is a continuation of application Ser. No. 08/116,465, filed Sep. 3, 1993.

BACKGROUND OF THE INVENTION

1. Field of the Invention

This invention relates to emergency position indicating radio beacons which are used in emergency situations to locate personnel, typically lost at sea, through the transmission of radio frequencies on guard channels, and in particular, to a hand-sized emergency radio beacon that is water-activated through the use of a water-activated switch.

2. Description of the Prior Art

The use of emergency position indicating radio beacons for locating personnel stranded at sea or on land are well known in the prior art. Typically, the device is battery powered, compact, and when manually turned on through the use of a manually-actuated on/off switch, the device will transmit radio waves at predetermined frequencies, typically 121.5 MHz and 243 MHz, which are guard channels that are listened to for emergency situations. By sending out an emergency signal at these frequencies, the Coast Guard and other surrounding people who are alerted to the guard channels are aware of the emergency and can use the frequency transmissions for locating the downed personnel.

Typically, the conventional emergency radio beacons must be manually activated by rotating or moving an exterior mounted switch to turn the device on. This allows the device to be kept off to preserve battery power until the actual emergency arises. This gives a long shelf life to the device and the batteries. There are situations, however, where through injury to the person in the emergency situation or because of lack of time, it is difficult or impossible to manually turn on the switch to activate the device. If an aviator, for example, carrying a small, personal sized radio beacon, ejected from an aircraft or crashed into the sea, the person may not be capable of turning the switch on manually to activate the radio beacon. To overcome this problem, the present invention provides for a water-activated switch that activates the emergency radio beacon automatically and independent of the parties carrying the device by allowing the radio beacon to be turned on and transmit when the switch makes contact with, and is submerged in, water.

The water-activated switch also includes a structure to prevent it from being accidentally triggered by inadvertent moisture surrounding the water-activated switch.

SUMMARY OF THE INVENTION

An emergency position indicating radio beacon for transmitting RF signals at predetermined frequencies for locating lost personnel, particularly in an ocean environment, comprising a waterproof housing, an RF antenna connected to said housing in a waterproof manner, a power supply such as a 12-volt battery mounted inside said housing, an electronic circuit generating predetermined RF signals for transmission through said antenna mounted within said housing and connected to said power supply and said antenna, a first manually-actuated on/off switch connecting said power supply to said transmitting circuits, and a second water-activated switch connected in series with said first manual switch, said water-activated switch disposed outside of said housing and connected in series to said manually-actuated switch and said power supply by electrical conductors with insulators surrounding them.

The water-activated switch is mounted on a rigid, electrically insulated, thin, rectangular paddle, preferably made of plastic, that is connected to two wires that extend from the housing of the radio beacon. The paddle acts as a weight and also as a protective device that determines the amount of surrounding moisture to allow the water-activated switch to be activated. The paddle, which is a thin, rectangular, rigid, electrically insulating member, includes a pair of longitudinal grooves, one on each side, that are separated by the insulating body, which receive and have the conductive wire ends from the housing rigidly mounted thereto, each with wire end portions being exposed on each side within each channel. The exposed wire ends are the contact points when immersed in water that conduct a current in water. The overall configuration, shape, and thickness of the paddle then provides a minimum separation distance electronically from the exposed conductor ends, which will only allow current flow if the conductor ends are submerged in an ionizing liquid that completely surrounds the paddle. Moisture accumulating on one side or both sides independently will not trigger the device.

Inside the housing, the water-activated switch also is connected to a switching circuit that provides memory, so that the radio beacon will not shut off if the paddle bobs in and out of the water, and also includes a power gain and a switching threshold to provide sufficient current to turn the transmitters on.

In a typical device, a manual switch is also provided on the housing for a master control the overall system. In series is the water-activated switch outside of the housing. Emerging from the plastic housing is the pair of electrical conductors, joined together and insulated from each other by a surrounding plastic covering. The conductors may be from one to three feet long. At the end of the conductors is mounted the paddle, which is connected rigidly to the conductors. The emergency radio beacon is small enough to be hand-held and is typically mounted and connected to a life vest with the paddle and water-activated switch portion being mounted near the base of the life vest.

In operation, in an emergency, when the life vest is put on, the user would turn the manual switch on the radio beacon to "on," which does not turn the entire system on until the water-activated switch is activated. Once the user is in the water and the paddle for the water-activated switch is completely submerged in water, current will flow across the exposed conductors on the paddle, activating a switching circuit within the housing, causing the transmitter to broadcast RF signals. The radio beacon can be turned off if the water-activated switch and paddle are removed from the water after a period of time that is pre-set, such as 20 seconds.

It is an object of this invention to provide an improved emergency position indicating radio beacon that can be automatically activated for locating downed personnel in an emergency situation as soon as the downed personnel is in the water.

It is another object of this invention to provide an emergency radio beacon that has a water-activated switch with predetermined moisture thresholds to prevent inadvertent activity or actuation due to surrounding moisture.

And yet another object of this invention is to provide an emergency radio beacon with a water-activated switch that must be submerged in water for activation, and that includes memory to prevent shutting on and off if bobbing in water, and a power gain.

In accordance with these and other objects which will become apparent hereinafter, the instant invention will now be described with particular reference to the accompanying drawings.

DESCRIPTION OF THE PREFERRED EMBODIMENTS

Figure 1:
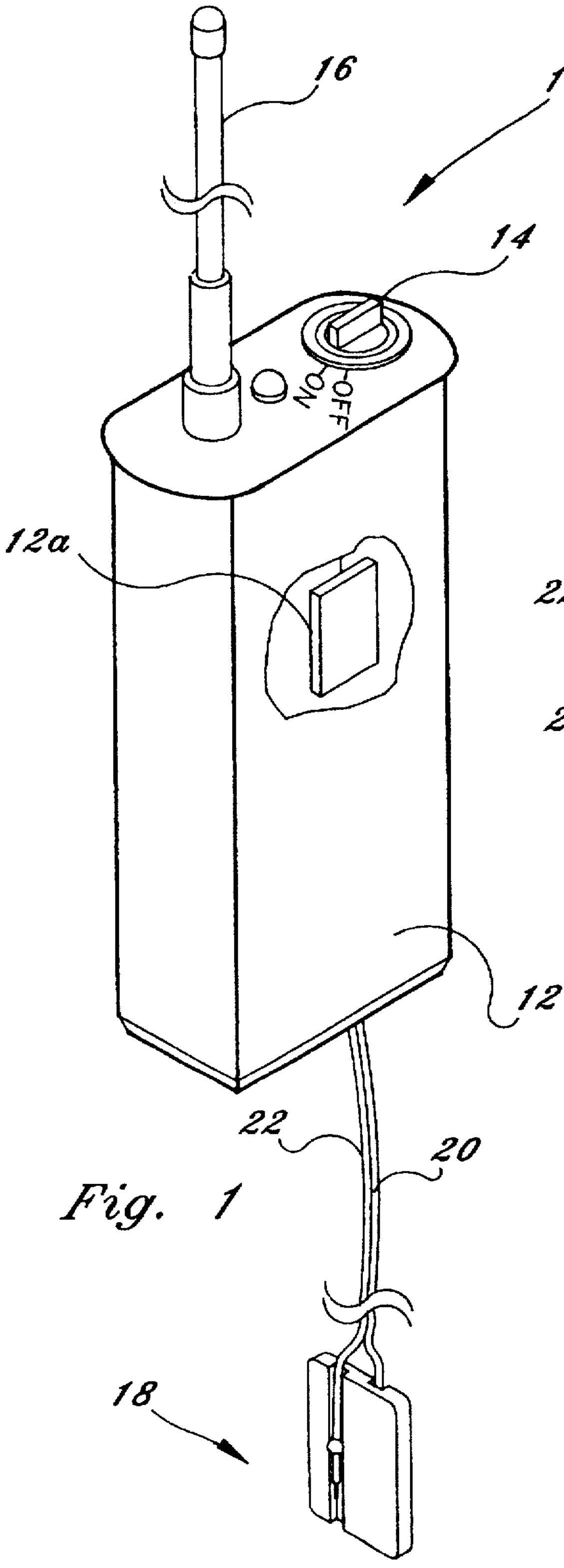
FIG. 1 shows a perspective view of the present invention.

Referring now to the drawings, and in particular to FIG. 1, the present invention is shown generally at 10, comprised of a plastic, waterproof housing 12 that includes therein circuitry **12*a* that can generate RF signals at predetermined frequencies, preferably 121.5 and 243 MHz, for transmission through an antenna 16 sealably connected electrically to circuitry 12*a*. An exterior manually-actuated on/off switch 14 is also connected electrically inside housing 12 to broadcast circuitry 12*a*** and a power supply.

A second switch, shown generally at 18, is a water-activated switch that has insulated conductors 20 and 22 that are electrically connected inside housing 12 to the broadcast circuitry **12*a* and in series with switch 14**, as further described below.

As shown in FIG. 1, in order to activate the radio beacon, which provides emergency position indicating information through the RF signals transmitted from antenna 16, manually-actuated switch 14 would be turned to the "on" position, but would not turn on the broadcast transmitter until water-activated switch 18 is completely submerged in water, preferably salt water. The water cannot be distilled water, but must have sufficient ions to allow a current flow between the exposed ends of conductor 20 and 22, which completes the circuit and turns on the broadcast transmitter. In a typical use, the small housing 12 would be hand-sized, rigid, rectangular plastic, and would be firmly mounted to a life vest before the emergency situation and be part of a life vest. Likewise, the water-activated switch 18 would be mounted near the base of the lift vest to insure its immersion in water and will have electrical conductors 20 and 22 of between one to three feet in length which are mounted to the life vest in a manner to prevent entanglement with the user. When the user wearing a life vest enters the water, this assures that water-activated switch 18 will be below the water line to permit activation.

The circuitry **12*a* that relates specifically to creating the position indicating transmitted frequency is conventional and is contained inside housing 12** which includes battery power connected thereto.

Figure 2:
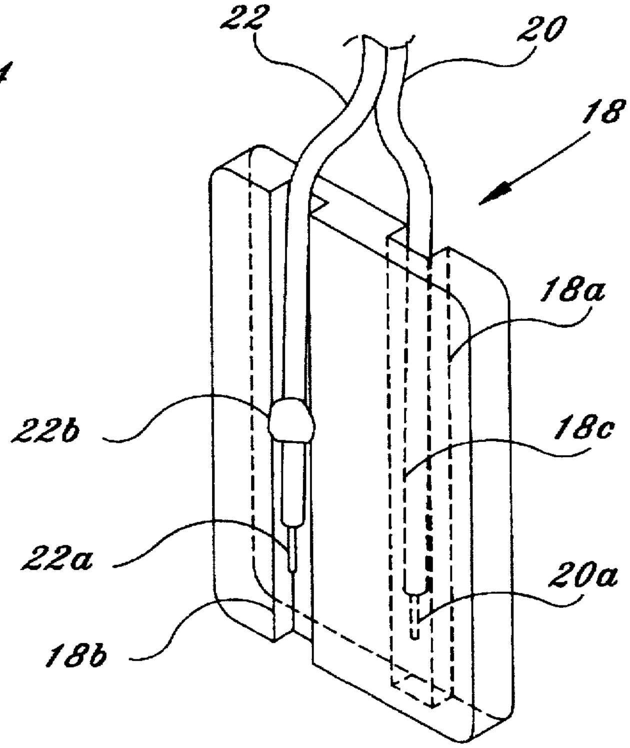
FIG. 2 shows a perspective view, partially cut away of the water-activated switch paddle used with the present invention.

The present invention provides an additional circuit which includes in FIG. 2 a water-activated switch 18 that is mounted on a rigid, electrically insulating, rectangular paddle **18*a*, which includes longitudinal groove 18*b* on one side and groove 18*c* on the opposite side, spaced laterally apart. The electrical conductors 20 and 22 are each mounted in a different recessed groove 18*c* and 18*b*, respectively, permanently affixed by an epoxy 22*b* or other fastening device. Each conductor 20 and 22 has an insulating exterior and a conductive metal wire 20*a* and 22*a* having exposed ends so that electrical conductive wire 20*a* is exposed to the ambient environment, as well as electrical conductive wire 22*a*. Note that the exposed ends are mounted within the recess of each of the grooves 18*c* and 18*b*. If the paddle body 18*a* contacts a surface with moisture on one side, this will not be sufficient to activate an electrical connection between conductor portion 22*a* that is exposed and conductor portion 20*a***. The device must be mounted in sufficient depth of water to accomplish this. Even if one side is exposed to a water surface, if the other side bearing the conductive exposed portion is not emerged in the water, then there will be no electrical contact. The purpose of the separation is to create a threshold wherein a slight amount of moisture will not activate this device. It must be immersed in a body of water in order to activate. This could be especially useful if wet life vests are stacked together. With the switch paddle, surrounding moisture will not trigger the device inadvertently.

Figure 3:
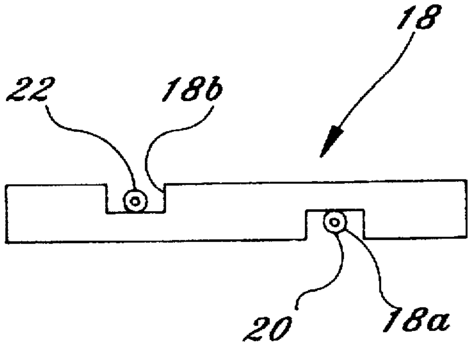
FIG. 3 shows a top plan view in cross section of the present invention's water-activated switch and paddle.

FIG. 3 shows the spatial separation which is predetermined in length, thickness, and distance, so that when immersed in a fluid that contains sufficient ions, a circuit electrical contact will be maintained.

Figure 4:
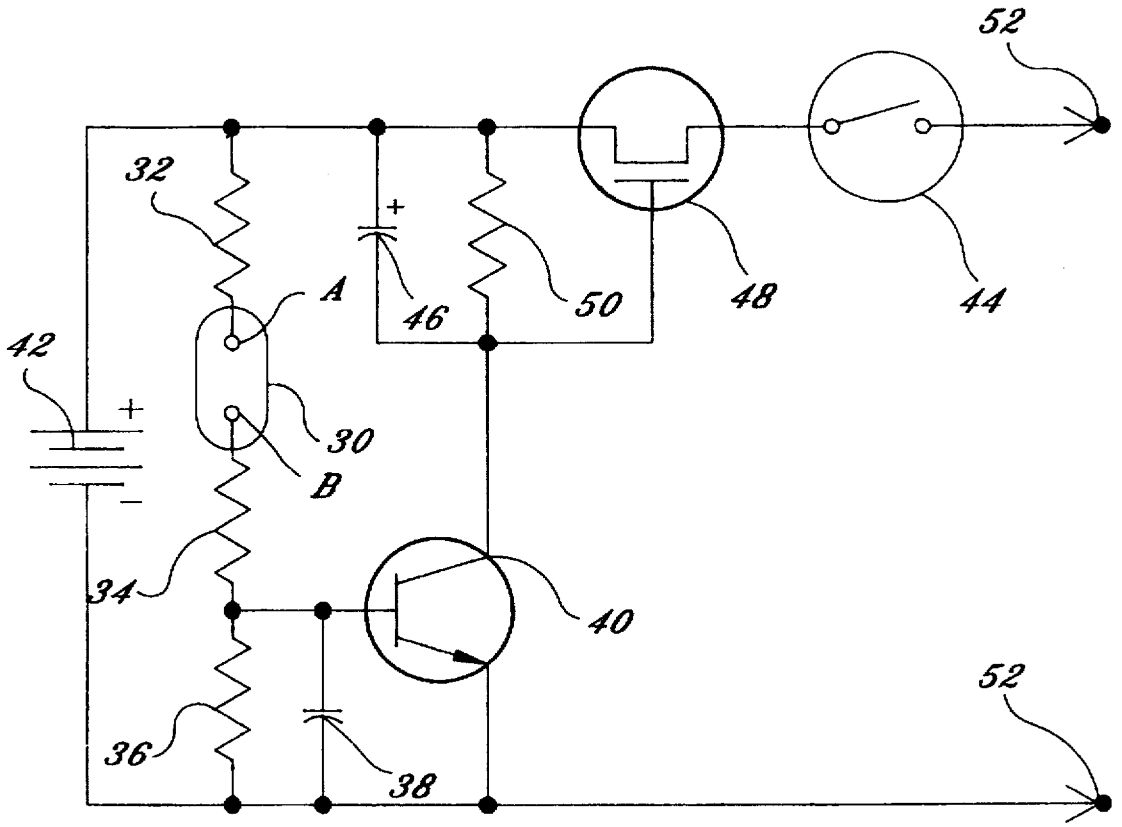
FIG. 4 shows a circuit diagram of the water-activated switch portion of the present invention.

The water-activated switch, formed by the paddle body and the dual wire conductor separation and insulation from each other, is used with an additional circuit (in the housing) that includes memory to prevent the device from turning on and off if the person and life vest are bobbing in water, such that the life vest containing the water-activated switch portion should momentarily be above the water line due to wave action. There is a predetermined threshold of 20 seconds that will keep the device on if the water-activated switch paddle is not in water. Also, because of the low current flow in water across the exposed conductor ends on the water-activated switch 18, an additional power gain is provided inside the housing of the device to insure actuation of the device. FIG. 4 shows the water-activated switching circuit that includes exposed contacts 30 being contacts A and B which represent the exposed wires **22*a* and 20*a* shown in FIG. 2 connected across resistors 32 and 34 and resistor 36, which will control the amount of resistance necessary to allow the circuit to fire. A transistor 40 and capacitor 38 are used to fire the device through a field effect transistor P-channel 48 that also includes a capacitor 46 and resistor 50. A 12-volt battery source 42 is connected across the water-activated switch in series with the manually-actuated switch 44 of which the switching device is on the top of the housing. The contacts 52 represent connections to the radio beacon transmitting circuitry, which is conventional. The circuit as shown will provide power to that transmitter, turning it on, allowing the transmitter to broadcast. Resistor 36 determines the contact resistance threshold that will actually activate the device when water surrounds the water-activated switch 18 as shown by element 30 in FIG. 4. Capacitor 46 provides memory so that if element 30, representing the contacts is removed from water, thus disconnecting the water-activated portion from the circuit, capacitor 46 will discharge for a predetermined time period, allowing the device to stay on to prevent on/off activation if the water-activated switch portion may be bobbing in the ocean, for continuous transmitter effect. This circuit also provides for a power gain through transistors 40 and 48** inasmuch as the current across the water-activated switch is a few microamps.

Therefore, to activate the device, switch 44 must be in an "on" position. In addition, the device will not transmit until element 30, which is the water-activated switch 18 shown in FIG. 2, is submerged sufficiently in water to provide a sufficient current flow above the threshold value. The manual switch is kept in the "off" position when the device is in storage to increase and preserve the shelf life of battery 42, which is typically a 12-volt lithium battery. When an emergency situation arises, the manual switch 44 is turned to the "on" position. From that point on, any time the water-activated switch is submerged in water, such as when a person is in the water with a life vest on, with the emergency radio beacon attached thereto, the transmitter will broadcast an emergency signal. However, using the water-activated switch shown in the present invention, the device will not be inadvertently activated by moisture on the surface adjacent the paddle or on one side of the paddle, but insures that the water-activated switch must be immersed sufficiently in water to allow current flow between the exposed, separated conductor ends.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An emergency position indicating radio beacon for personal use and for attachment to personal floatation devices, comprising:

a waterproof housing arranged to be worn by a user or attached to a personal floatation device;

an electrical power supply mounted within said housing;

circuit means mounted inside said housing for generating radio frequency signals for broadcast;

an antenna connected to said housing exterior and electrically connected to said circuit means for broadcasting and transmitting said radio frequency signals from said antenna as a radio beacon;

a manually actuated electrical switch having an on and an off mode for connecting said power supply to said radio frequency generating circuit means;

a water-activated electrical switch connected to said circuit means, said water-activated electrical switch being remotely disposed from said waterproof housing, said water-activated switch being tethered to said housing by electrical conductors, whereby whenever said water-activated switch is immersed in water and said manually activated switch is in an on mode, said radio beacon will transmit radio frequency signals; and memory circuit means connected to said water-activated switch for activating said radio frequency circuit means for a predetermined period of time whenever said water-activated switch is removed from said water immersion to provide uninterrupted radio frequency signal transmissions while said emergency position indicating radio beacon is in use;

said water activated switch includes:

an essentially planar electrically insulated barrier having a pair of recessed grooves separated from each other by a first predetermined distance, said grooves offset from each other by a second predetermined distance, said grooves essentially parallel to each other, said first predetermined distance equal to the separation between said parallel grooves, said grooves positioned on opposite surfaces of said electrically insulated barrier, said second predetermined distance defined by a predetermined thickness of said electrically insulated barrier; and first and second electrical conductors, each connected at one end to said radio frequency transmitting circuitry and said power supply, and at the opposite end, each connected within said separated grooves mounted in said electrically insulated barrier, said conductors including an insulating means covering said wire conductors up to near the ends of the conductors, said conductors having an exposed electrical portion mounted within said grooves, said conductive wire ends strategically spaced apart by said first and said second predetermined distances to require immersion in an ionizing liquid to complete circuit contact across said electrical conductor ends.

2. An emergency position indicating radio beacon as in claim 1, including power amplifying circuit means connected to said water-activated switch and said radio frequency transmitting circuit means for amplifying the signal received from the water-activated switch.

3. An emergency position indicating radio beacon for personal use and for attachment to personal floatation devices, comprising:

a portable waterproof housing arranged to be worn by a user of attached to a personal floatation device;

an electrical power supply mounted within said housing;

circuit means mounted inside said housing for generating radio frequency signals for broadcast;

an antenna connected to said housing exterior and electrically connected to said circuit means for broadcasting and transmitting predetermined radio frequency signals from said antenna as a radio beacon;

a liquid-activated electrical switch remotely disposed from said waterproof housing, said liquid-activated switch being tethered to said housing and activating broadcast of said radio frequency signals;

memory circuit means connected to said radio frequency generating circuit means mounted inside said housing and connected to said liquid-activated switch for activating said radio frequency circuit means for a predetermined period of time whenever said liquid-activating switch is removed from its liquid immersion to provide uninterrupted transmissions of said radio frequency signals when said emergency position indicating radio beacon is in use; and a pair of insulated electrical conductors, at least one foot in length, having first ends and second ends, and connected at said first ends to said circuit means mounted within said housing and at said second ends to said liquid-activated switch, each of said conductors having an insulating cover, said insulated electrical conductors comprising a tether, whereby the liquid-activated switch can be remotely located in a different location than said liquid-proof housing allowing the housing to be located away from the liquid within which the liquid-activated switch is immersed;

said liquid-activated switch includes:

an essentially planar electrically insulated barrier having a pair of spaced apart substantially parallel, grooves, each groove on an opposite surface of said essentially planar insulated barrier, each groove spaced apart a predetermined distance from each other and offset by a predetermined thickness of said barrier; and said pair of insulated electrical conductors having said second ends mounted within said grooves in said insulated barrier, each second end on each opposite surface of each barrier, each second electrical conductor ends having exposed conductor end tips free of said electrical insulating material, said second end tips of said electrical conductors being located in said grooves; and means for holding each of said second conductor end tips in said grooves, said conductor wire end tips strategically spaced apart by the predetermined distance of said grooves and offset by said predetermined thickness of said barrier to require immersion of said liquid-activated switch in an ionizing liquid to complete circuit contact across said electrical conductor end tips.

4. An emergency position indicating radio beacon as in claim 3, including a manually actuated electrical switch having an on and an off mode for connecting said power supply to said radio frequency generating circuit means.

* * * * *